United States Patent
Waters et al.

[11] Patent Number: 5,942,737
[45] Date of Patent: Aug. 24, 1999

[54] HIGH VOLTAGE GUARD WITH INTERLOCK

[75] Inventors: John Eugene Waters, Fishers; Gerald Keith Sentman, Indianapolis, both of Ind.

[73] Assignee: General Motors Corporation, Detroit, Mich.

[21] Appl. No.: 09/172,837

[22] Filed: Oct. 15, 1998

[51] Int. Cl.⁶ ..................................................... H01H 9/20
[52] U.S. Cl. .................................. 200/50.28; 200/50.02; 200/50.12; 200/50.3
[58] Field of Search ............................ 200/50.01, 50.02, 200/50.03, 50.12, 50.13, 50.15, 50.18, 50.19, 50.28–50.3; 361/615–617, 667, 726, 732, 747, 759

[56] References Cited

U.S. PATENT DOCUMENTS

| | | | |
|---|---|---|---|
| 2,645,687 | 7/1953 | Parish | 200/50 |
| 3,088,004 | 4/1963 | Mueller | 200/50 |
| 3,735,078 | 5/1973 | Appleton et al. | 200/168 G |
| 4,503,293 | 3/1985 | Knecht | 200/50 B |
| 5,198,627 | 3/1993 | Diaz et al. | 200/50 B |

*Primary Examiner*—Michael Friedhofer
*Attorney, Agent, or Firm*—Lawrence B. Plant; Kathryn A. Marra

[57] ABSTRACT

A battery pack has a plurality of batteries connected in series to provide a high voltage energy source and energy storage. The battery pack has a high voltage receptacle in which a high voltage harness is connected when power is to be distributed or stored. a cover guard prevents inadvertent access to the harness connector. The cover guard has integral therewith an electrical disconnect mechanism and latch mechanism which must be manipulated prior to exposing the harness connector. The disconnect mechanism eliminates the electrical connection of the batteries to a receptacle in which the harness connector is installed. The latch mechanism prevents removal of the cover guard prior to manual disconnection and also prevents reconnection prior to the cover guard being properly positioned.

9 Claims, 8 Drawing Sheets

5,942,737

HIGH VOLTAGE GUARD WITH INTERLOCK

TECHNICAL FIELD

This invention relates to disconnect mechanisms for high voltage electrical systems.

BACKGROUND OF THE INVENTION

Electrical batteries are used to store and supply energy for electrical systems. Vehicles, operating at least partially on electrical power, have a battery pack installed. The battery pack consists of a plurality of batteries connected in a series string to establish a high voltage electrical power source. When used as the primary or sole energy source in automotive vehicles, it has become common to use several battery modules, each providing 12 volts, that are connected in a series string to form a battery pack having a high voltage output.

The battery pack generally terminates at a high voltage connector receptacle into which a harness connector is installed. This receptacle is located on an exterior surface of the casing in which the battery pack is housed. The harness delivers power to various parts of the vehicle, including the drive motors. It is common practice to provide a disconnect mechanism between the battery pack and the receptacle to insure that the harness is neither installed in or removed from the receptacle prior to the battery pack being disconnected. This eliminates the possibility that service personnel will come into contact with the high voltage energy source when manipulating the harness or that arcing will occur when the disconnect mechanism is properly actuated.

The electrical disconnection of the battery pack from the receptacle has commonly taken two forms—manual and automatic disconnect mechanisms have been employed. The manual disconnect mechanism is generally installed at or near the midpoint of the battery string. The disconnect mechanism is generally in the form of a handle which serves as a switch to break the electrical connection. When the handle is pulled, a physical break in the battery string is occasioned to thereby interrupt the electrical connection between the battery pack and the harness connector. The disconnect mechanism is provided so that anyone removing the harness connector will not come into contact with the high voltage source.

The automatic disconnect mechanism interrupts the battery string by employing electrical sensors and algorithms that determine the conditions under which the battery pack should be disconnected from the connector. Upon sensing a fault condition, the battery pack is shut down, with software commands, and checked to determine that proper handling conditions exist. This type of disconnect mechanism is performed by electrical switching and typically does not employ mechanical disconnection devices. While both type of disconnect mechanisms are effective, they do not prevent inadvertent contact with the high voltage output of the battery pack at the connector receptacle.

SUMMARY OF THE INVENTION

It is an object of the present invention to provide an improved manual disconnect mechanism and interlocking mechanism for a high voltage energy storage source.

In one aspect of the present invention, a push type manual disconnect mechanism must be depressed to open the electrical circuit prior to the removal of a cover guard to expose a high voltage receptacle connector and harness.

In another aspect of the present invention, mechanical interlocks between the manual disconnect mechanism and the cover prevent rotation of the cover prior to manipulation causing the disconnection of the battery pack from the receptacle connector.

In yet another aspect of the present invention, the cover guard must be reinstalled prior to the manual disconnect mechanism being manipulated to close the electrical circuit.

In a further aspect of the present invention, a plurality of lugs on the manual disconnect mechanism engage slots on the cover guard to prevent relative rotary motion therebetween prior to manipulation of the manual disconnect.

In a yet further aspect of the present invention, the manual disconnect mechanism is prevented from reestablishing an electrical connection until the lugs are aligned with the slots thereby insuring proper location of the cover guard.

DESCRIPTION OF AN EXEMPLARY EMBODIMENT

Figure 1:
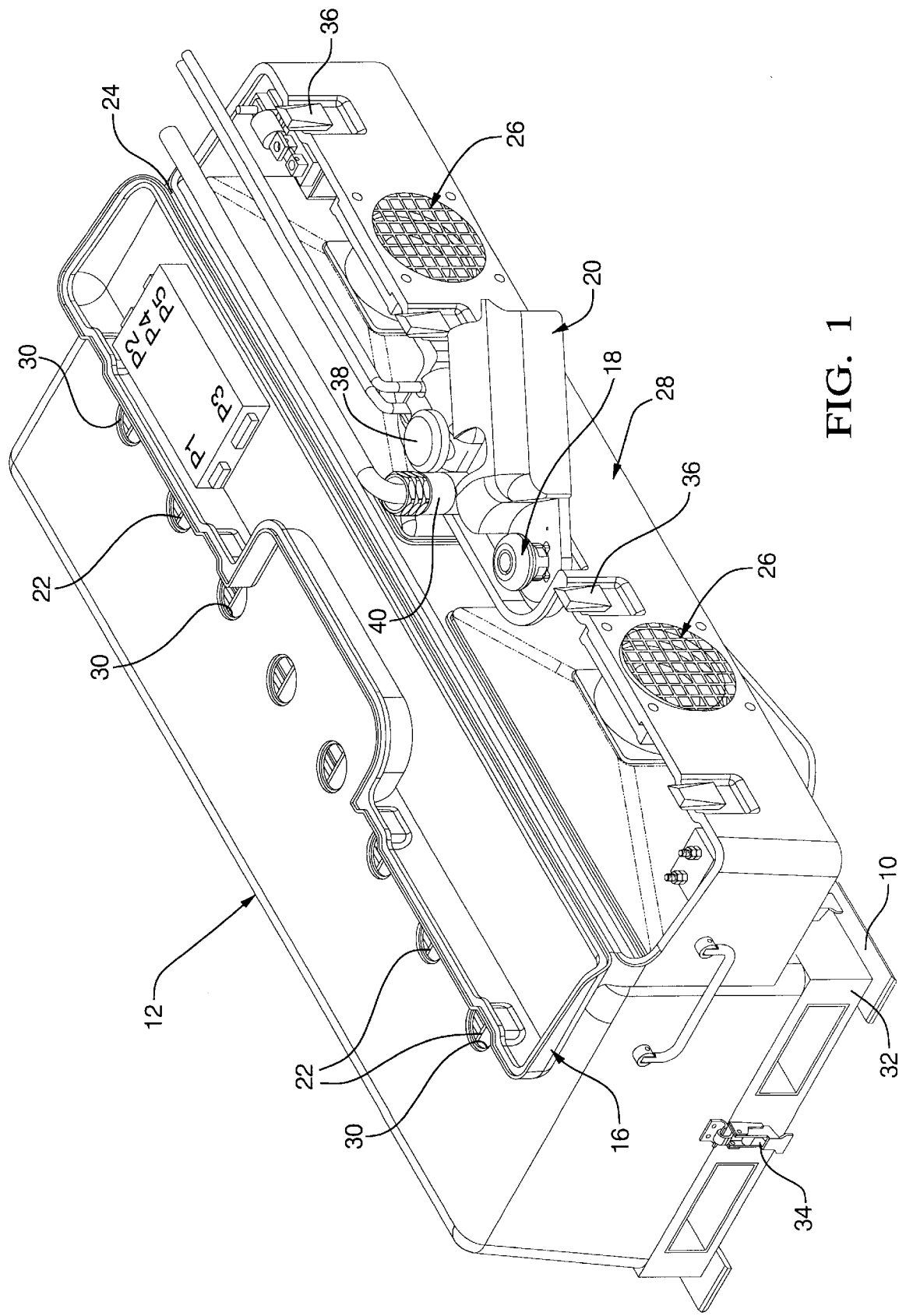
FIG. 1 is an isometric view of a battery pack and interlocking disconnect mechanism incorporating the present invention.

Referring to the drawings wherein like characters represent the same or corresponding parts throughout the several views there is seen a battery tray 10 having a housing or pack cover 12, an accessory cover 16, a manual disconnect mechanism or switch 18 and a cover guard 20. The battery tray has a plurality of batteries 22 secured therein and covered by the pack cover 12. The batteries 22 are connected in an electrical series string to provide a high voltage output. For example, twenty four (24), twelve volt (12v) batteries might be employed in an electric vehicle. Thus the output voltage can be quite high.

Figure 3:
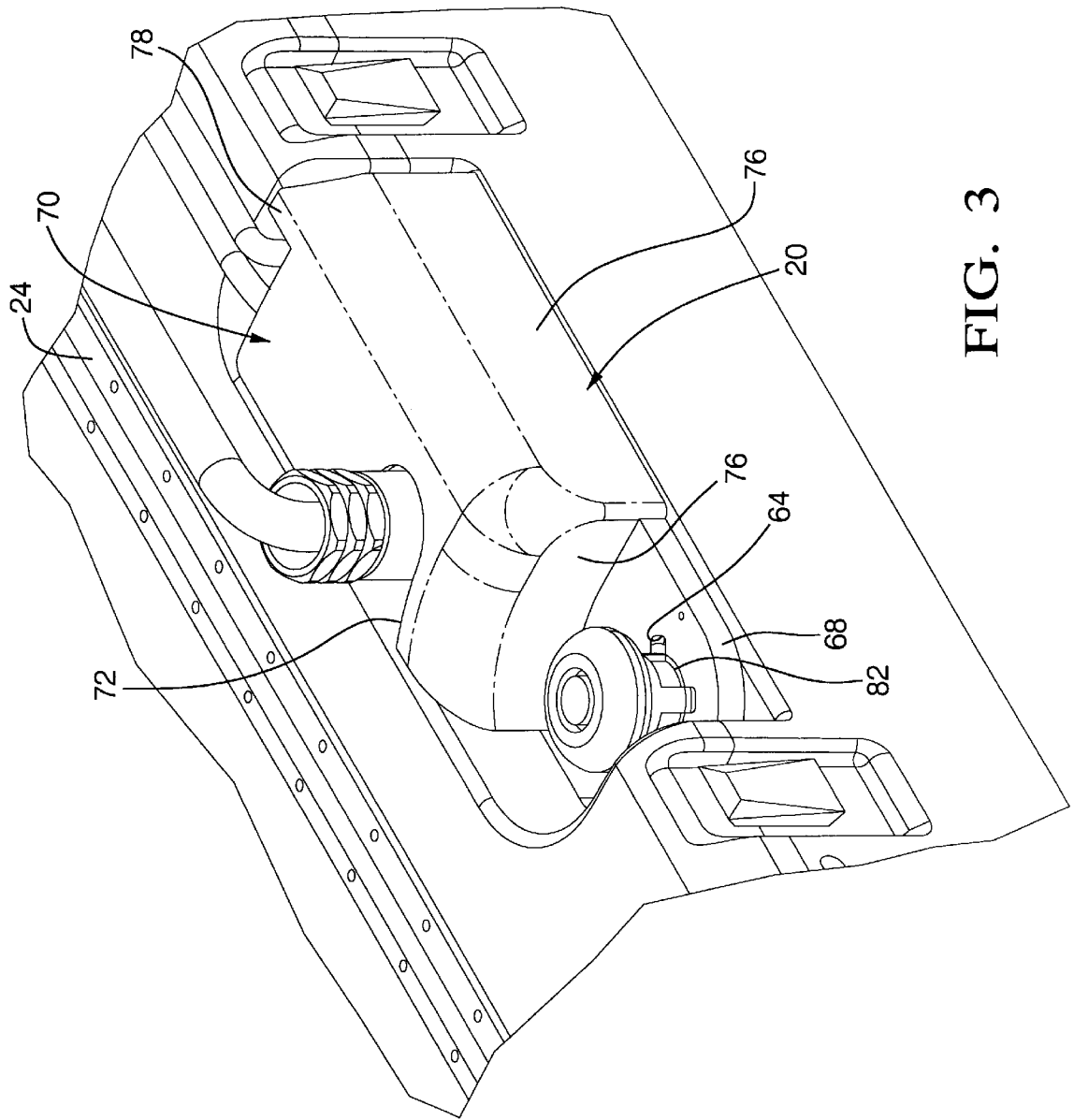
FIG. 3 is an isometric view of a portion of the battery pack and interlocking disconnect mechanism shown in FIG. 1 depicting a cover guard in a closed position.

The accessory cover 16 has a hinge 24 which connects it with the pack cover 12. The accessory cover 16 can be opened independently of the pack cover 12, but not without the cover guard 20 being manipulated to an open position as shown in phantom line in FIG. 1 and in FIGS. 3 and 4. The accessory cover allows access to control elements, such as electronic modules, not shown.

The pack cover 12 has vent openings 26 in a side face 28 and openings 30 in the pack cover 12. These allow cooling air to circulate around the string of batteries 22 The pack cover 12 has a base portion 32 to which the pack cover 12 is connected and held closed by latches 34. The accessory cover 16 is secured closed by latches 36 disposed on the pack cover 12.

The cover guard 20 encloses both a high voltage harness connector 38 and a signal harness connector 40. The connector 38 is plugged into a high voltage receptacle 42 which is connected with the string of batteries 22. The connector 40 is connected with a signal receptacle 44 which is connected with a control module positioned in the housing under the accessory cover 16. The manual disconnect mechanism 18 is electrically positioned between the string of batteries 22 and the receptacle 42. The function of the manual disconnect mechanism 18 is to break the electrical circuit between the batteries 22 and the receptacle 42 when it is necessary to work on or effect repairs of various high voltage components, such as drive motors, which utilize the high voltage output of the batteries 22.

The high voltage output of the batteries 22 must be disconnected from the high voltage receptacle 42 prior to access by the service personal. The manual disconnect mechanism 18 provides this function. The cover guard 20 ensures that the manual disconnect mechanism 18 is actuated prior to the high voltage receptacle 42 being accessible.

As best seen in FIGS. 8, 9, 10, 11, 12 and 13, the cover guard 20 has a guard plate 68 having an opening 46 surrounding an upstanding posts 48 formed on a disconnect mounting plate or collar 50. The collar 50 is secured to the housing 12 and the disconnect mechanism 18; and is restrained from rotation relative thereto. The guard plate 68 has a second opening 52 which has portions 54 thereof extending under diametrically opposed tongues 56 formed on the plate 50 and thereby restrain axial movement of the cover guard 20 relative to the disconnect mechanism 18. The disconnect mechanism 18 has a palm button 60 on which is mounted a collar 61 having lugs 62 formed thereon. The guard plate 68 has slots 64 formed therein which are communicating with opening 46 and radially alignable with lugs 62 formed on the collar 61.

The plate 50 has slots 66 and openings 67 both of which are axially alignable with the slots 64 and radially alignable with the lugs 62. When the lugs 62 are engaged in respective slots 64 and openings 67, the cover guard 20 is restrained from rotation due to the stationary positioning of the disconnect mechanism 18 in the housing 12.

When the lugs 62 are disengaged from the slots 64 and openings 67 upon depression of the palm button 60, they are positioned in the slots 66 only and the cover guard 20 is not restrained from rotation by the manual disconnect mechanism 18. Thus when the palm button 60 is depressed, the cover guard 20 can be rotated to the open position shown in FIGS. 3 and 4.

The manual disconnect mechanism 18 is comprised of a commercially available battery disconnecting switch having a snap action overcenter spring not shown. These switches are capable of breaking an electrical circuits even when full load battery current is present. The breaking contacts are weld resistant to withstand any arcing during the disconnecting operation. The overcenter spring insures the switch will be held in the position selected by the operator. Thus, when the palm button 60 is actuated or depressed to an off or disengaged position, the lugs 62 will remain in the slots 66, allowing free rotation of the cover guard 20, until the palm button 60 is returned upwardly to the unactuated or engaged position.

Figure 2:
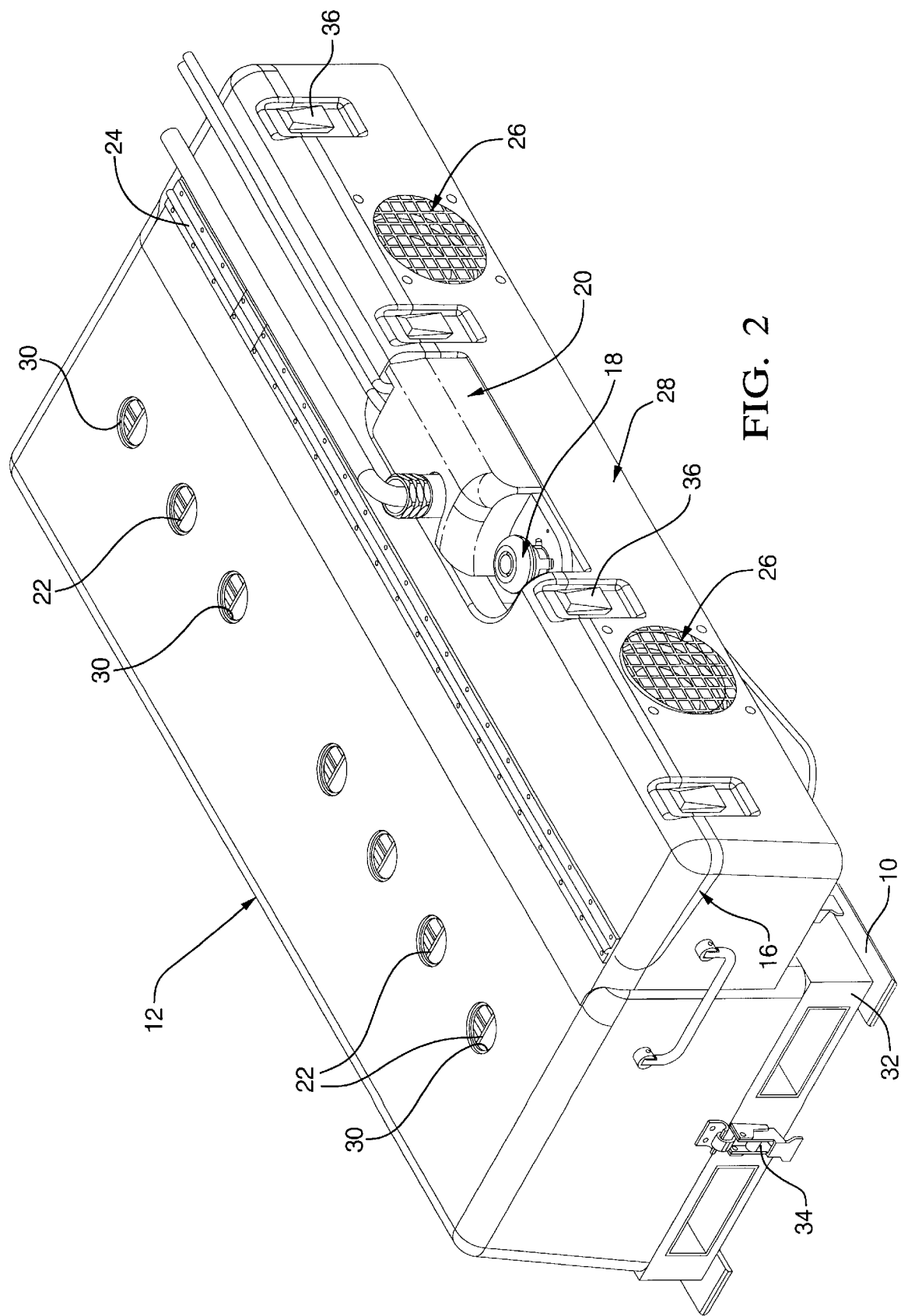
FIG. 2 is an isometric view similar to FIG. 1 showing the locked position.

The cover guard 20 has a cover portion 70 secured to the guard plate 68. The cover portion 70 has an arcuate opening 72 in a top wall 74, which accommodates the signal harness connector 38, a side walls 76 and a lip extension 78. The top wall 74 and side walls 76 prevent access to the receptacle 42 when the cover guard 20 is held in the closed position by the manual disconnect mechanism 18. The lip extension 78 cooperates with a complementary curved surface 80 formed on the accessory cover 16 to prevent inadvertent opening of the cover 16 while the cover guard 20 is in the closed position shown in FIGS. 2 and 3.

When it is necessary to service the high voltage mechanism, the high voltage harness 38 must be disconnected. To accomplish this, the palm button 60 is depressed thereby disconnecting the string of batteries 22 from the high voltage receptacle 42. When the palm button 60 is depressed to the off position, the lugs 62 will disengage the slots 64 to permit the rotation of the cover guard 20 thereby exposing the high voltage harness 38 to permit its disconnection.

Figure 4:
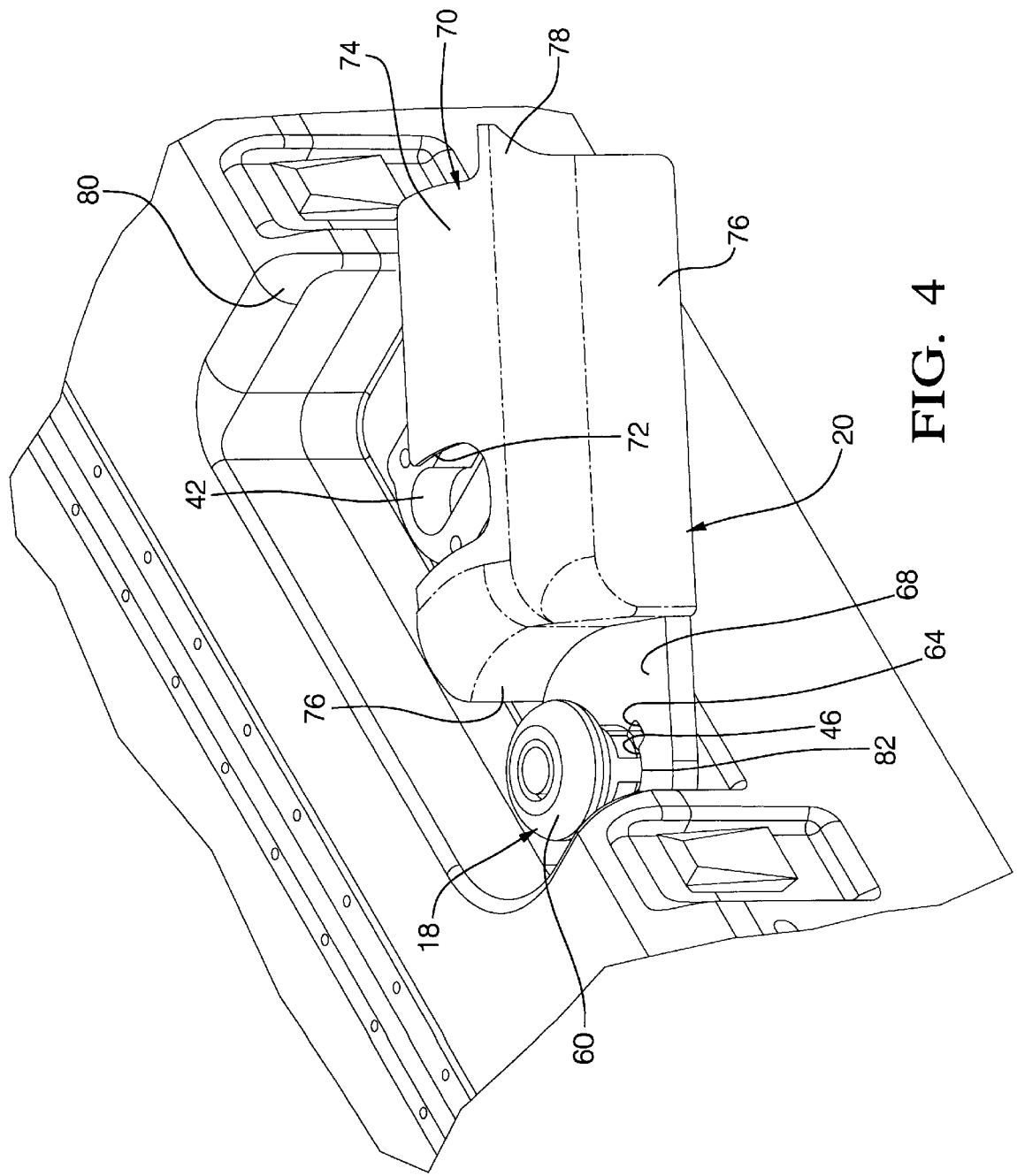
FIG. 4 is a view similar to FIG. 3 with the cover guard in an open position.
Figure 5:
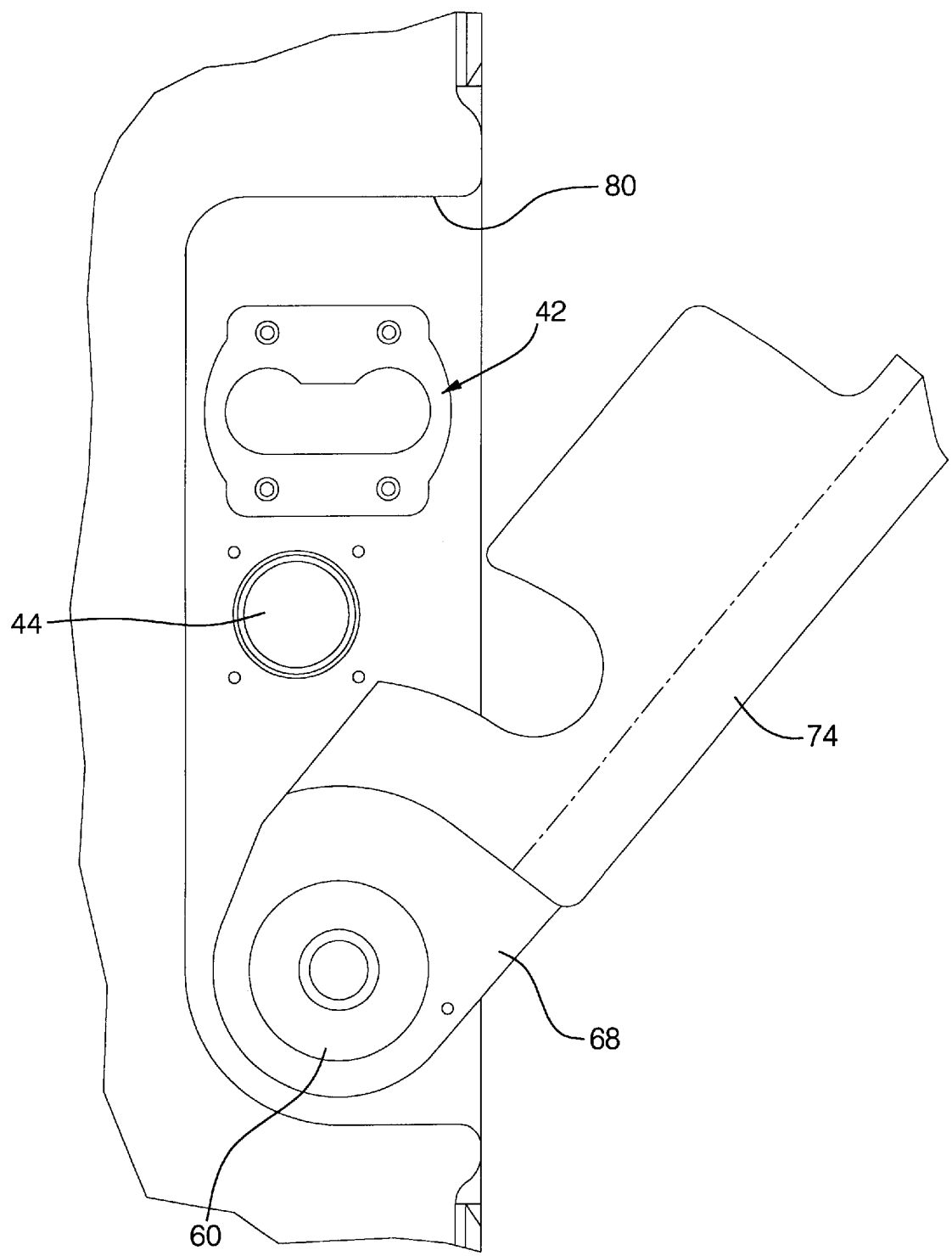
FIG. 5 is a top view of the cover guard shown in FIG. 4.
Figure 6:
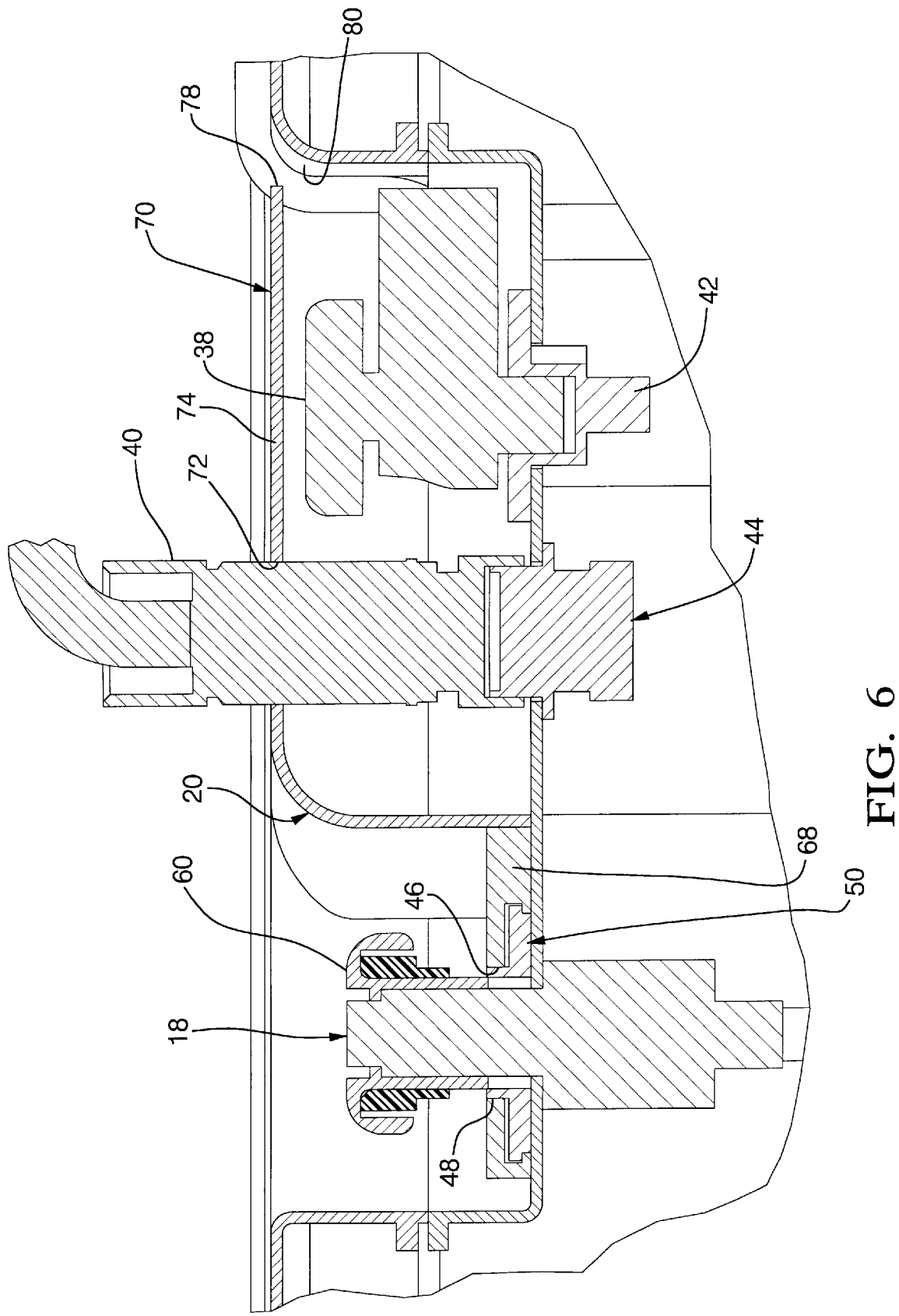
FIG. 6 is a sectional side elevational view of a portion of the disconnect mechanism and cover guard.
Figure 7:
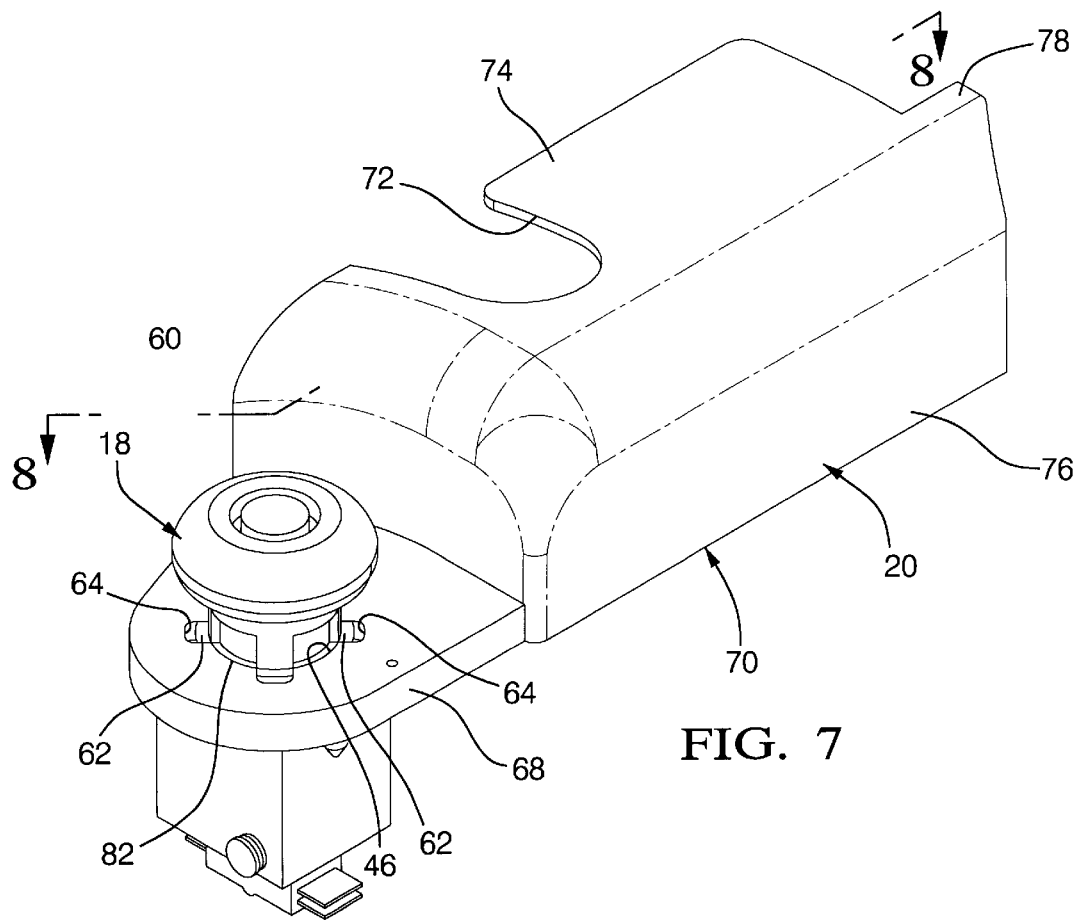
FIG. 7 is an isometric view of the manual disconnect mechanism and cover guard mechanism.
Figure 8:
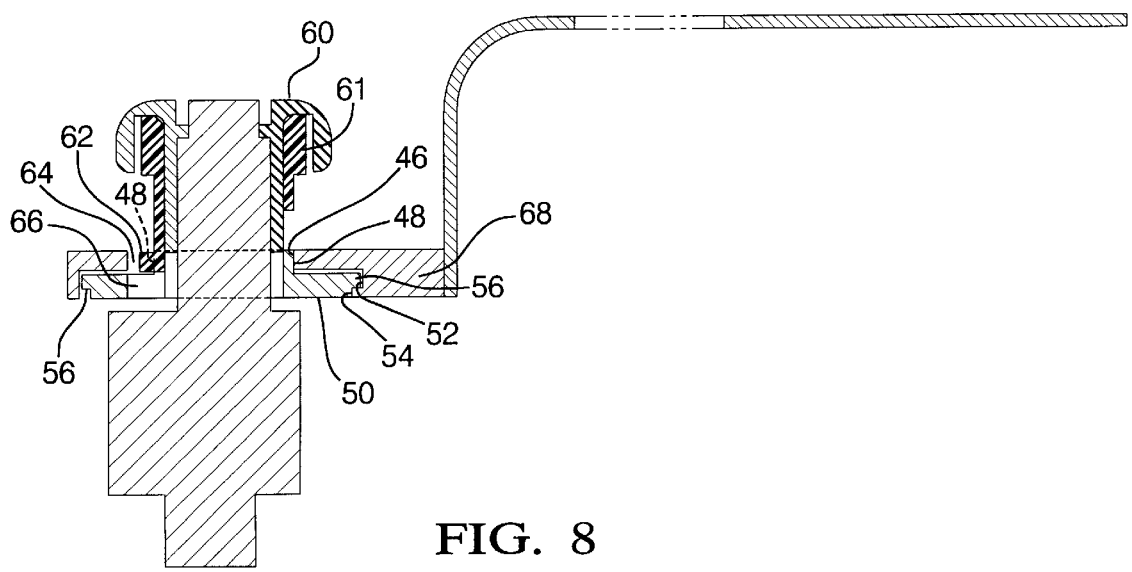
FIG. 8 is a crossectional view taken along line 8—8 in FIG. 7.
Figure 9:
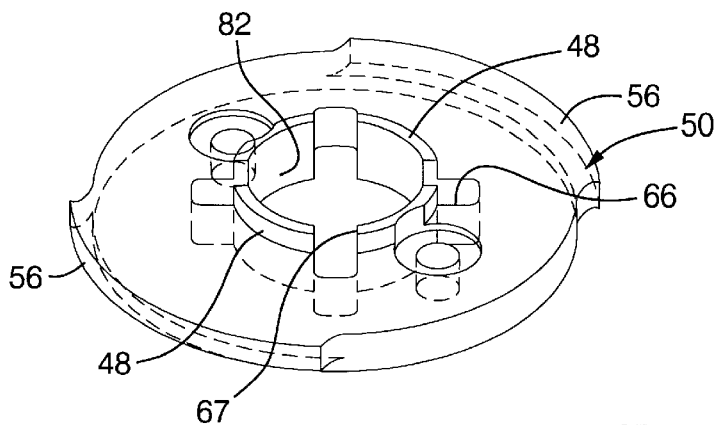
FIG. 9 is an isometric view of a mounting plate portion of the disconnect mechanism.
Figure 10:
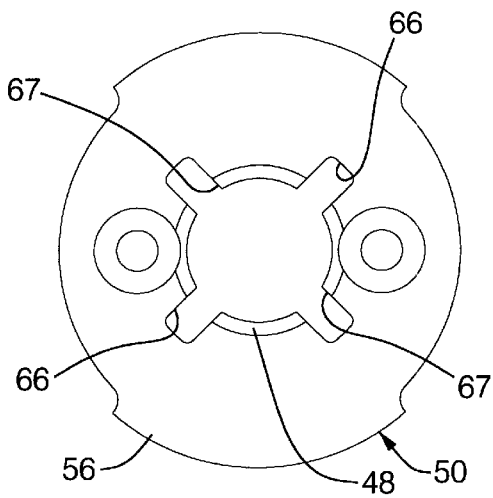
FIG. 10 is a top view of the mounting plate shown in FIG. 9.
Figure 11:
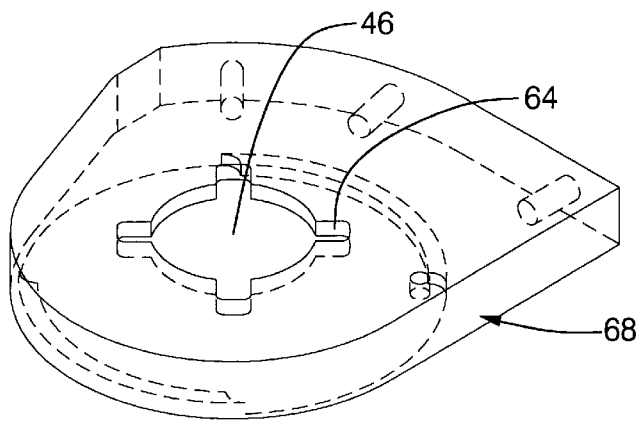
FIG. 11 is an isometric view of a plate guard portion of the cover guard.
Figure 12:
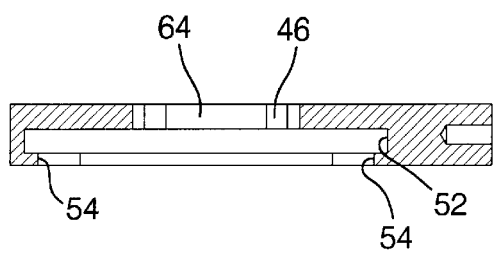
FIG. 12 is a sectional elevational view of the plate guard portion shown in FIG. 11.
Figure 13:
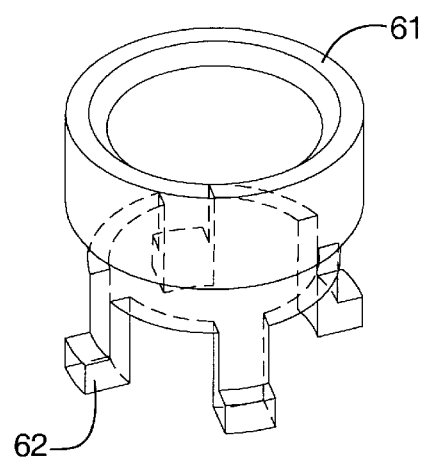
FIG. 13 is an isometric view of a collar portion of the disconnect mechanism.

When the cover guard 20 is rotated to the open position, as shown in FIG. 4, lugs or protuberances 82, disposed between the slots 64, on the guard plate 68 will overlay the lugs 62 on the palm button 60 so as to be axially aligned therewith. This will prevent the palm button 60 from being returned to the up or engaged position until the cover guard 20 is rotated for return to the closed position. This prevents the inadvertent reconnection of the high voltage receptacle 38 through manipulation of the disconnect mechanism 18 when the cover guard 20 is not properly positioned.

It should be apparent from the above description that the cover guard 20 provides two very important functions in high voltage devices. The cover guard 20 prevents access to the high voltage receptacle 42 unless it has been disconnected from the high voltage source, and prevents reconnection to the high voltage source unless the cover guard 20 is returned to the closed position. These functions are accomplished by providing unique improvements while using a conventional disconnecting switch. The invention requires no changes to the switch contacts or other internal switch structures

We claim:

1. A cover and interlock for a high voltage electrical system having an energy source and an output receptacle comprising: a manual disconnect mechanism having on and off positions and being electrically positioned between the source and the receptacle; a cover rotatably mounted on said manual disconnect mechanism for rotation between an open position and a closed positions; and interlocking means formed between said manual disconnect mechanism and said cover for preventing rotation of said cover when said manual disconnect mechanism is in the on position and for preventing said manual disconnect mechanism from being changed from said off position to said on position when said cover is in the open position.

2. The cover and interlock defined in claim 1 further comprising: said disconnect mechanism having a displaceable portion with radially extending lugs and said cover having radial slots disposed for meshing relation with said lugs when said cover is closed.

3. The cover and interlock defined in claim 2 further comprising: said disconnect mechanism having a collar with radial slots registering with said lugs when said disconnect mechanism is in said off position.

4. The cover and interlock defined in claim 3 further comprising: said cover having a plate portion incorporating said slots and protuberances circumferentially adjacent said slots and overlaying said lugs when said disconnect mechanism is in the off position and said cover is in said open position.

5. A cover and interlock for a high voltage electrical system having an energy source and an output receptacle comprising: a manual disconnect mechanism having on and off positions and being electrically positioned between the source and the receptacle; a cover guard rotatably mounted on said manual disconnect mechanism for rotation between an open position and a closed positions; an accessory cover; and interlocking means formed between said manual disconnect mechanism and said cover guard for preventing rotation of said cover guard when said manual disconnect mechanism is in the on position and for preventing said manual disconnect mechanism from being changed from said off position to said on position when said cover is in the open position and for inhibiting opening of said accessory cover when said cover guard is in said closed position.

6. The cover and interlock for a high voltage electrical system having an energy source defined in claim 5 further comprising: said interlock means having a lip portion overlaying a complementary surface on said accessory cover when said cover guard is closed and said accessory cover is in a closed position.

7. The cover and interlock for a high voltage electrical system having an energy source defined in claim 5 further comprising: said disconnect mechanism having a displaceable portion with radially extending lugs and said cover having radial slots disposed for meshing relation with said lugs when said cover is closed.

8. The cover and interlock for a high voltage electrical system having an energy source defined in claim 7 further comprising: said disconnect mechanism having a collar with radial slots registering with said lugs when said disconnect mechanism is in said off position.

9. The cover and interlock for a high voltage electrical system having an energy source defined in claim 8 further comprising: said cover having a plate portion incorporating said slots and protuberances circumferentially adjacent said slots and overlaying said lugs when said disconnect mechanism is in the off position and said cover is in said open position.

\* \* \* \* \*